United States Patent [19]

Lemmond

[11] Patent Number: 4,716,825
[45] Date of Patent: Jan. 5, 1988

[54] VEHICLE MOUNTED COMPACTION IMPLEMENT

[76] Inventor: Chester Lemmond, Rte. 4, Box 74, Decatur, Ala. 35603

[21] Appl. No.: 9,221

[22] Filed: Jan. 30, 1987

[51] Int. Cl.$^4$ .............................................. B30B 15/04
[52] U.S. Cl. ..................... 100/226; 100/100; 173/28
[58] Field of Search ................. 100/65, 100, 257, 226; 404/133; 173/28, 22; 37/117.5; 56/DIG. 1, 482

[56] References Cited

U.S. PATENT DOCUMENTS

| | | | |
|---|---|---|---|
| 3,495,527 | 2/1970 | Lafreniere | 100/226 |
| 3,635,133 | 1/1972 | Stougaard | 404/133 |
| 3,691,967 | 9/1972 | Mettetal, Jr. | 100/226 |
| 3,797,382 | 3/1974 | Muzzi et al. | 100/100 |
| 3,896,720 | 7/1975 | Rhodes | 100/226 |
| 4,082,034 | 4/1978 | Wright | 100/215 X |
| 4,294,169 | 10/1981 | Baird | 100/100 |
| 4,344,272 | 8/1982 | Gaudette | 56/16.6 |
| 4,548,131 | 10/1985 | Williams | 100/1 |

Primary Examiner—Andrew M. Falik
Attorney, Agent, or Firm—Dowell & Dowell

[57] ABSTRACT

An implement for compacting fibrous and other compressible materials and especially freshly picked cotton which is transported in mobile trailers or loaded into containers so as to increase the load capacity thereof. The apparatus includes a compaction ram assembly which is both horizontally and vertically adjustably supported relative to a conventional vehicle such as a farm tractor to which the implement is selectively mounted.

18 Claims, 7 Drawing Figures

VEHICLE MOUNTED COMPACTION IMPLEMENT

BACKGROUND OF THE INVENTION

1. Field of the Invention

This invention is generally directed to mobile compaction equipment and more specifically to a compaction implement which may be used in field environments and which is selectively mounted to a conventional vehicle such as a farm tractor and which includes a compaction assembly which is horizontally and vertically adjustably maneuverable with respect to the tractor so as to allow a compaction ram to be extended over and into the bed of a transporting trailer of the type that is conventionally used to haul harvested cotton and other fibrous or other compactable materials. The compaction assembly is hydraulically operated and controlled by being directly connected to the hydraulic system of the supporting vehicle and is mounted to a horizontal adjustable support carriage which is also controlled by the hydraulic system of the supporting vehicle. The support carriage is pivotally mounted for movement in a vertical plane to the implement mounting frame which is detachably mounted to the supporting vehicle.

2. History of the Prior Art

In the harvesting of such fibrous materials as cotton, the cotton is initially picked in the field and then transported to a location where it is prepared for future use. The harvesting process is very labor intensive and often very inefficient due to the nature of the cotton itself.

Currently, in many farming operations, after the cotton is picked, it is loaded into large trailers which are then transported to local gin mills. In an effort to reduce costs by increasing the amount of picked cotton which can be shipped per trailer load, many farmers have utilized the technique of manually compacting the loose cotton within the trailer so that additional quantities of cotton may be shipped in a given trailer load. Such manual compaction, however, is itself labor intensive requiring three to six workers per trailer and with the effective amount of compaction being limited.

In an effort to modernize and mechanize the shipment of seed cotton from the fields to the ginning mills, growing use has been made of special in field compaction equipment which can be utilized to bail the picked seed cotton for future shipment. Such equipment does have the advantage of increasing the amount of cotton which can be effectively shipped per vehicle, however, the initial equipment cost may be prohibitive especially for the intermediate and smaller size farm operations.

Some recent examples of in field cotton module compactors are disclosed in U.S. Pat. Nos. 3,896,720 to Rhodes, 4,294,169 to Baird, 4,344,272 to Gaudette et al. and 4,548,131 to Williams. In several of these patents, the cotton is initially loaded into a storage or container portion of the compaction vehicle after which the cotton is compressed into modules for future shipment. After being compacted into modules, the cotton is discharged from the compaction vehicle. In the patent to Rhodes, an enlarged vehicluar structure is provided which straddles a conventional cotton hauling trailer and includes a presser plate which may be urged to compress or compact the cotton which has been loaded into the trailer.

Such prior art structures are not only large and extremely bulky but require considerable outlays of capital to acquire and are also expensive to maintain. Therefore, such vehicles are not practical in all harvesting situations.

In addition to the foregoing, many of the currently manufactured cotton compaction vehicles utilize their own storage containers or compartments and therefore do not make any use of existing transportation, hauling or storage equipment. Such vehicles therefore do not offer the cotton farmer the ability to modernize shipping operations without totally replacing existing equipment.

Some additional examples of prior art compaction equipment are disclosed in U.S. Pat. Nos. 3,495,527 to Lafreniere and 3,691,967 to Mettal, Jr.

SUMMARY OF THE INVENTION

This invention is directed to a portable compaction implement which may be utilized to compact such fibrous materials as seed cotton and the like in containers or transportation carriers so as to increase the volume of product which may be loaded and/or shipped therein. The compaction implement is designed to be selectively mounted to an existing farm vehicle such as a conventional tractor or the like and is operated utilizing the hydraulic control system of the farm vehicle. The implement includes a vertically movable compaction ram which is used to compress the material being introduced into a container or transportation carrier. The ram is horizontally maneuverable relative to the container or carrier by a carriage assembly that moves along the spaced rails of a vertically pivotable support frame which is articulated to the implement mounting frame assembly by way of which the implement is attached to the farm vehicle. The articulated carriage support and implement mounting frames permit the compaction ram and the carriage assembly to be selectively lowered or collapsed into a compact configuration therewith so that the implement can be transported without interference to overhead power or telephone lines. Thereafter, the articulated carriage support and implement mounting frames may be operated utilizing the hydraulic system of the farm vehicle to extend the compaction ram and carriage upwardly and outwardly with respect to the vehicle so that the compaction ram may be sequentially operated in a vertical orientation to compress the seed cotton or other fibrous material being loaded into the containers or transportation carriers.

It is the primary object of the present invention to provide a compaction implement which may be mounted to conventional farm or other types of vehicles so as to be powered by the hydraulic system of such vehicles and which includes a compaction ram which may be horizontally and vertically manipulated in cantilevered relationship with respect to a vehicle to thereby permit the ram to be utilized to compact material which is being loaded into an adjacent transportation or storage receptacle, container or trailer.

It is yet another object of the present invention to provide a compaction implement which may be utilized to compact cotton and other fibrous material which is being loaded for transportation from the field where such material is harvested wherein the seed cotton may be compacted directly in a conventional transportation trailer without requiring additional trailerized equipment or the modification of the existing trailer.

It is yet another object of the present invention to provide a portable compaction implement which may be selectively mounted to the front end of a conventional vehicle such as a tractor and wherein the implement includes a ram assembly which is extendable relative to the vehicle mounting frame so as to be movable upwardly and outwardly with respect to the vehicle whereby the ram assembly may be selectively positioned to facilitate the transportation of the implement from one area to another without interfering with overhead power lines or other obstacles.

It is also an object of the present invention to provide a compaction implement which may be utilized to compact cotton or other fibrous or compactable material which is being loaded in transportation or storage receptacles without any changes being made to the receptacles to facilitate the compaction of material therein.

It is a further object of the present invention to provide a compaction implement for use in compacting newly harvested cotton or other materials which are to be transported so as to increase the volume of material being carried per transport vehicle and wherein the implement includes a ram assembly which is mounted to a horizontally adjustable carriage which is automatically controlled so as to limit the displacement of the ram assembly with respect to the side walls of the transport vehicle so as to insure that substantially all the material within the vehicle can be compacted by the ram assembly without interference or damage to the vehicle.

It is another object of the present invention to provide an implement for use with conventional farm machinery which will enable such machinery to perform compaction operations especially associated with the shipment of such fibrous materials as seed cotton without requiring conversion or replacement of the machinery currently being used but which will allow such machinery to be used more effectively thereby decreasing the amount of labor and expense normally required with the transportation of such materials.

DESCRIPTION OF THE PREFERRED EMBODIMENT

Figure 1:
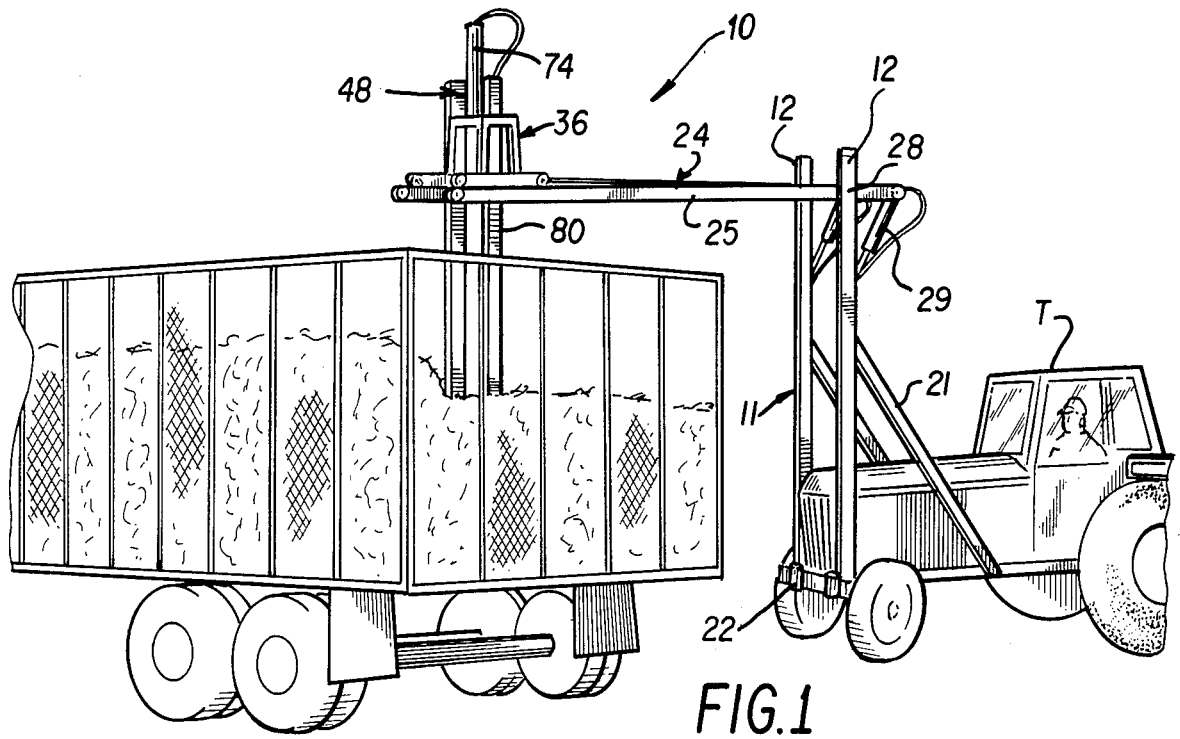
FIG. 1 is an illustrational view showing a conventional farm trailer having meshed side walls which trailer is of the type normally utilized to transport seed cotton from the field to a gin and wherein the compaction implement of the present invention is shown mounted to a conventional farm tractor.
Figure 7:
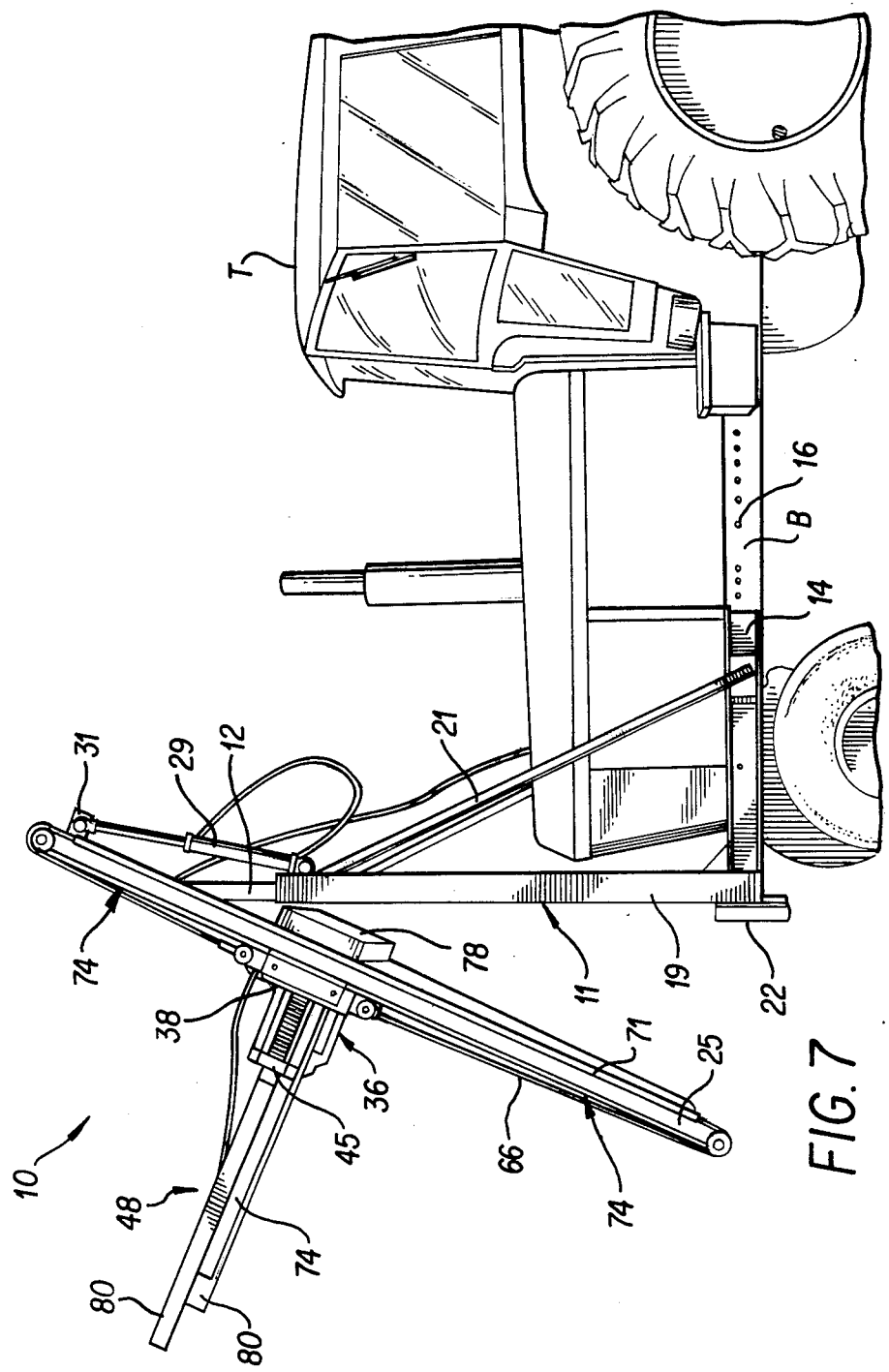
FIG. 7 is a side illustrational view of the compaction implement of the present invention showing its relationship with a conventional farm vehicle and showing the implement in a closed or collapsed position for purposes of transporting the implement from one area to another.

With continued reference to the drawings, the compaction implement 10 of the present invention is shown in FIGS. 1 and 7 as it is mounted to the front end of a conventional farm tractor T. The implement is secured to the tractor by way of a generally L-shaped or configured mounting frame assembly 11 having a pair of vertically oriented supports 12 which are secured at their lower ends to a U-shaped base 13 of the mounting frame. The base of the mounting frame includes a pair of spaced side channels 14 which abut the implement support beams B which are disposed along either side of the tractor undercarriage. One or more openings 15 are provided through each of the side channels 14 which openings are aligned with openings 16 through the implement support beams of the tractor. The implement mounting frame is attached to the tractor by extending one or more bolts or pins 17 through the aligned openings 15 and 16 through the side channels and the tractor implement support beam. Although not specifically shown in the drawings, additional bolts may be passed through a forward support frame member 18 which joins the two side channels 14 which bolts may secure the forward support frame member to the front implement support bar of the tractor.

Figure 2:
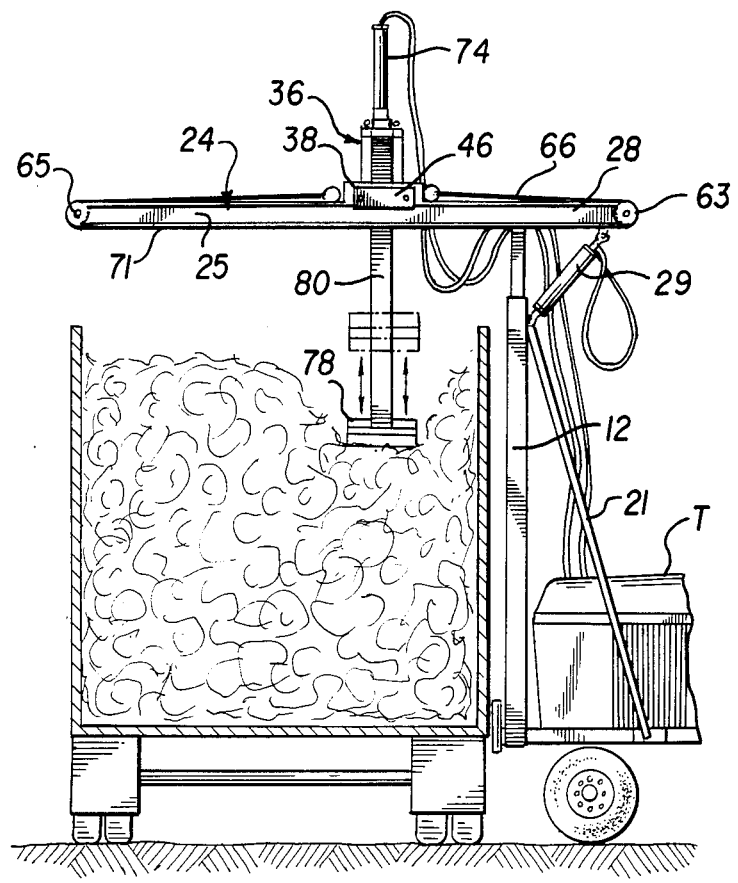
FIG. 2 is a side illustrational view showing the compaction implement of the present invention as it is used to compact seed cotton or other materials carried in a transportation trailer and further showing the orientation of the conventional vehicle to which the implement is mounted relative to the trailer during the operation of the compaction ram of the implement.

The vertical supports 12 of the mounting frame assembly 11 are shown as being outwardly flared adjacent the upper portion thereof with a pair of vertical reinforcing posts 19 extending from the uppermost end portion of the vertical supports downwardly to the side channels 14. In addition, several horizontal reinforcing beams 20 may be welded or otherwise secured between the vertical supports 12 in spaced relationship along the length thereof so as to rigidify the mounting frame assembly. To further distribute the weight carried by the mounting frame assembly with respect to the front end of the tractor, a pair of stabilizer bars 21 are also shown as extending from the upper portion of the vertical supports downwardly and rearwardly to the outer ends of the channels 14. The forward support frame member 18 also carries a pair of bumper elements 22 which are used as a cushion between the compaction implement and the side walls of the vehicle which is being approached by the tractor on which the implement is mounted. The relationship of the bumpers to a trailer is shown in FIG. 2 of the drawings.

Pivotally mounted to the upper ends of the vertical supports 12 is a carriage support frame 24 having a pair of generally parallel side rails 25 which are connected adjacent their outermost ends by an outer end beam element 26 and inwardly of the innermost ends thereof by an inner end beam element 27. As shown in the drawings, the inner end beam element 27 is oriented between the side rails 25 at a point adjacent to the pivoted connection shown at 28 between the carriage support frame and the upper ends of the vertical supports 12 of the mounting frame assembly. Due to this relationship, the inner ends of the side rails 25 are shown as being cantilevered over the forward end of the tractor and thereby provide arms or linkage which can be utilized to articulate or pivot the carriage support frame in an arc about the connection 28 so as to raise or lower the carriage support frame relative to the front end of the tractor. In order to accomplish this pivotable movement, a pair of hydraulic cylinders 29 are shown as being mounted to flanges 30 which are welded or otherwise attached in spaced relationship to the upper portion of the vertical supports 12. The hydraulic cylinder rods are shown as being attached to flange plates 31 which are secured adjacent the innermost ends of the side rails of the carriage support frame. Upon activation of the hydraulic cylinders 29, the carriage support frame will be rotated about the pivots 28 to thereby raise and lower the carriage support frame relative to the mounting frame assembly 11. The hydraulic cylinders 29 are directly controlled from the hydraulic system of the tractor to which the implement is mounted and thus include fluid intake lines 32 and fluid return lines 33 which extend between the cylinders and the appropriate connections on the hydraulic system of the tractor.

Each of the side rails 25 of the carriage support frame 24 include upper and lower surfaces 34 and 35. A movable carriage 36 is mounted for movement along the upper surfaces 34 of the side rails. The carriage includes a pair of side dollies 38 each of which includes a pair of spaced wheels or rollers 39 which are in contact with the upper surface of the side rails. Each of the dollies include base portions which are connected between the side rails by a first or lower ram guide frame 41. Each of the dollies also includes a pair of upwardly extending support members 42 and 43 which are joined at their upper ends by a second or upper ram guide frame 45. In order to insure that each of the dollies 37 are continuously aligned with the side rails 25, each dolly includes a depending guide flange 46 which extends downwardly from the base portions along the outside of each of the side rails so as to insure that the wheels 39 of the dollies will be retained in alignment with the upper surface of the side rails. The guides 46 will prohibit any lateral shifting of the carriage with respect to the carriage support frame.

The carriage is utilized to support the ram assembly 48 of the present invention and therefore must provide support structure for permitting the vertical movement of the ram assembly relative to the carriage and carriage support frame. In this regard, each of the first and second ram guide frames 41 and 45 are provided with a pair of spaced roller guides or bearings 50. Each roller guide includes four elongated rollers 51 each of which are mounted within support brackets 52. The rollers are spaced so as to provide a generally rectilinear opening therethrough for facilitating movement of portions of the compaction ram assembly as will be herein described in greater detail. It should be noted that the guides 50 of the first or lower ram guide frame 41 are vertically aligned with the guides 50 mounted to the upper or second ram guide frame 45.

Figure 6:
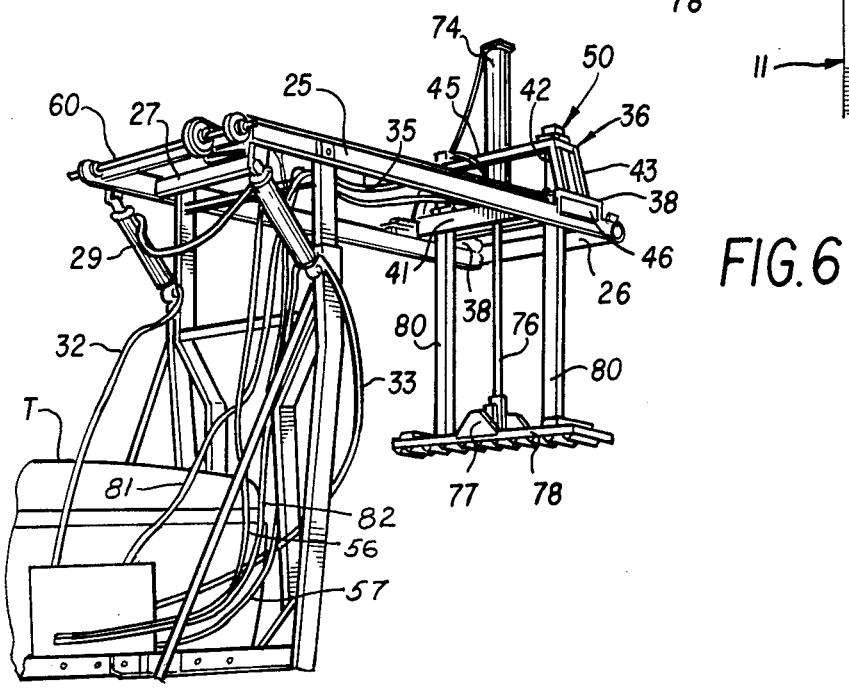
FIG. 6 is a partial perspective view of the compaction implement of the present invention showing the implement mounting frame as it is attached to the front end of a conventional farm tractor.

The movement of the support carriage along the side rails 25 is controlled by a hydraulic motor 54 which is supported on an intermediate support brace 55 which extends between the innermost ends of the side rails. The hydraulic motor is operatively connected to the hydraulic implement controls of the tractor diagrammatically shown in FIG. 6 by fluid inlet lines 56 and fluid outlet line 57. The hydraulic motor is of the type which is manually reversing for purposes of which will be described in greater detail hereinafter. The hydraulic motor is drivingly connected to a drive shaft 60 by way of a drive chain 61 and drive sprocket 62. The drive shaft 60 is mounted through the innermost ends of the side rails and a pair of sprockets 63 are connected at the outermost ends of the drive shaft. A driven shaft 64 having a pair of spaced sprockets 65 is mounted between the side rails adjacent the outer ends thereof. A pair of chain elements 66 comprising enlongated control line means are mounted about the sprockets 63 and 65 on either end of the carriage support frame. The chain elements extend from a first end 67 which is secured to U-shaped mounting frames 68 that are secured to the dollies 37 around the sprockets 63 and along the lower surface of the side rails and around sprockets 65 to their remote ends 69 which are connected to U-shaped mounting brackets 70 which are engaged to the opposite end of the dollies 38. In this manner, the chain elements and dollies form a pair of continuous belt-like drives which can be utilized to pull the carriage in either direction along the carriage support side rails depending upon the operational rotation of the reversable hydraulic motor 54.

Figure 5:
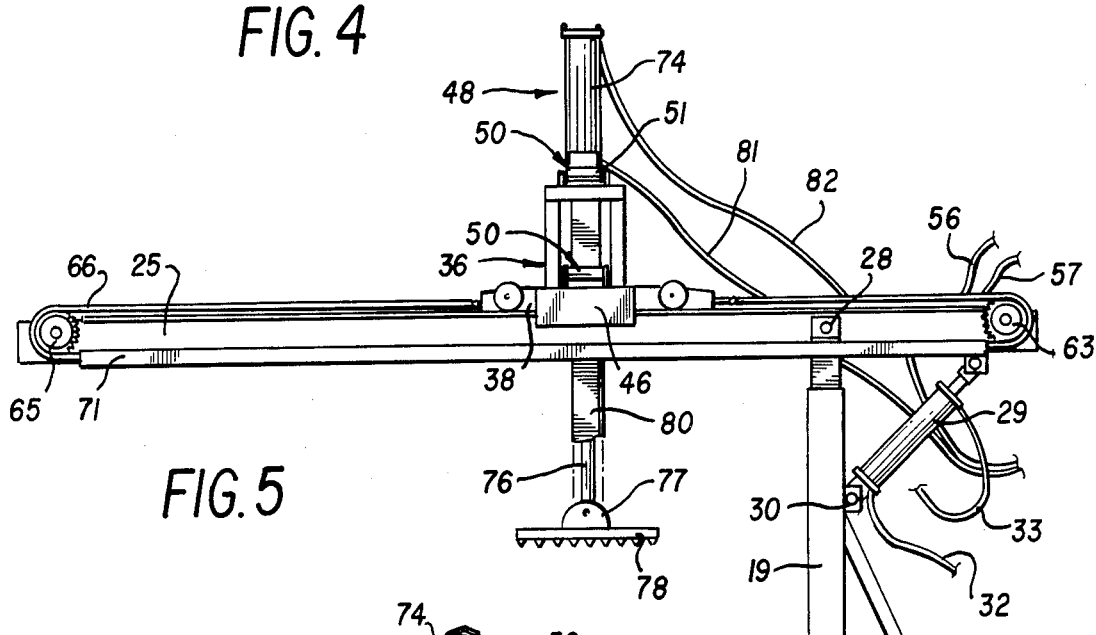
FIG. 5 is a side elevational view taken with respect to the top plan view of FIG. 4.

In order to prevent any interference of the chain elements 66 with the operation of the compaction implement, a pair of elongated channels or flanges 71 are provided adjacent the lower surface of each of the side rails through which the lower run of the chain elements extend, as shown in FIG. 5.

The effective horizontal displacement of the ram support carriage relative to the side rails of the carriage support assembly 24 is automatically controlled or limited by a pair of bumper elements 72 which are mounted to the outer end beam element 26 and extend inwardly thereof toward the movable carriage member. As the carriage moves outwardly toward the outermost end portions of the side rails, the bumper members 72 will limit the outward movement and prevent the wheels of the dollies from passing beyond the outer extremities of the side rails. In a like fashion, a single bumper member 73 is attached to the second or inner beam element 27 and extends inwardly towards the movable carriage. As the carriage approaches the inner bumper element 73, such bumper element will prevent the inward movement of the carriage. The bumper elements thereby effectively define the limits of the horizontal displacement of the ram assembly 48 carried by the carriage.

The spacing between the bumper element 72 and 73 is predetermined to only allow the carriage to operate between a specific limits so that the implement can be cooperatively utilized with standard transporting vehicles. With specific reference to FIG. 2 of the drawings, it can be seen that with the implement in place for use relative to the transporting vehicle, the carriage support frame is oriented generally horizontally above the bed of the vehicle. In this position, the support frame of the implement extends generally vertically in spaced relationship to the side wall of the vehicle. The movement of the carriage is therefore limited between an inner and outer extent which coincide with a dimension which is slightly less than the inner dimensions defined by the side walls of the vehicle. In this manner, any damage to the side walls of the vehicle will be prevented during the operation of the ram assembly of the compaction implement. In normal use, the limit of carriage travel would be approximately seven feet when the implement is used to compact materials in a vehicle having an eight foot wide load bed.

As previously discussed, the hydraulic motor 54 which controls the movement of the carriage is manually reversing so that no undue strain is placed on the hydraulic system of the controlling vehicle when the carriage abuts one of the limiting or bumper elements 72 and 73.

Figure 3:
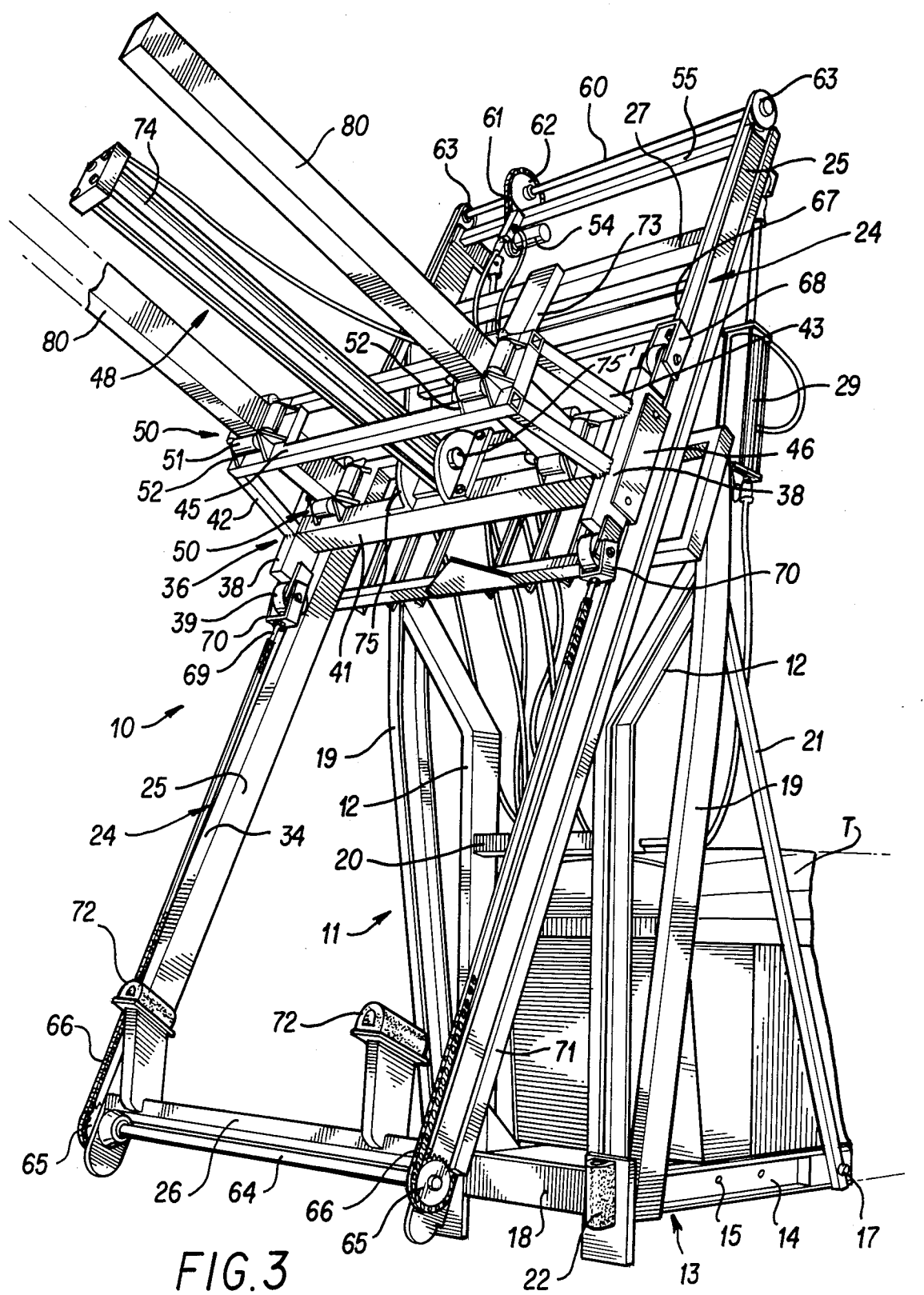
FIG. 3 is an enlarged perspective view of the compaction implement of the present invention with the articulated carriage support frame being shown in a closed or lowered position.
Figure 4:
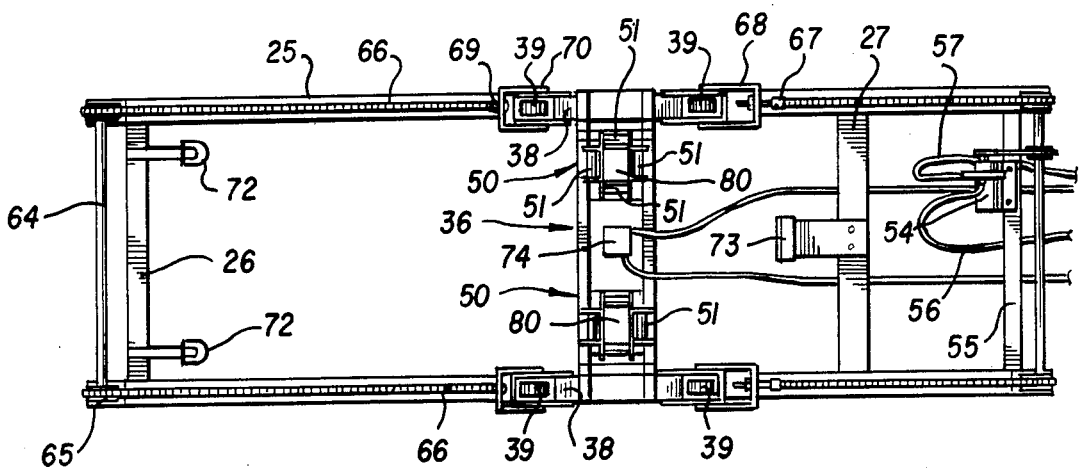
FIG. 4 is a top plan view of the compaction ram support carriage and carriage support frame of the present invention.

The compaction ram assembly 48 of the present invention includes a central hydraulic cylinder generally shown at 74 which is mounted by a pin 75 between a pair of mounting plates 75 which define a central mounting bracket and which are secured to the lower ram guide frame 41. As shown in FIG. 3 of the drawings, the hydraulic cylinder extends upwardly through both the lower ram guide frame 41 and the upper ram guide frame 45 and is oriented generally centrally between the dollies 38.

The hydraulic cylinder includes a piston rod 76 which extends downwardly thereof and which is mounted at its lower end to a bracket assembly 77 carried by a compaction plate 78. The connection between the piston rod 76 and the bracket assembly may be made by a single pin element to facilitate the removal of the compaction plate from the piston arm.

In order to further support or guide the compaction plate 78 relative to the carriage assembly, a pair of guide members 80 are disposed on opposite sides of the piston rod and extend upwardly through the aligned roller guides 50 which are carried by the upper and lower ram guide frames. The guide members 80 may be welded or otherwise secured to the upper side of the compaction plate. The guide members both stabilize the compaction plate and assure the alignment of the plate relative to the carriage during the vertically reciprocating movement of the plate as the hydraulic cylinder rod is extended and retracted.

The control of the hydraulic cylinder 74 is also through the hydraulic system of the tractor or other supporting vehicle with hydraulic fluid being provided through an inlet line 81 and directed outwardly thereof through outlet line or return line 82.

In constructing the compaction ram assembly of the present invention, it has generally been found that the piston rod 76 and the guide elements 80 should be approximately 5 to 6 feet in length thereby permitting the piston rod to which the compaction plate is attached to have a positive displacement inwardly of the vehicle of approximately 4 to 5 feet. Due to the height of the implement when oriented for use as shown in FIGS. 1 and 2 of the drawings, it is not safe to transport the implement due to the possible interference which may be encountered with overhead telephone and electrical lines as well as bridges and other overpasses. Therefore, the implement has been designed so that the compaction ram assembly may be raised and thereafter the carriage support frame pivoted relative to the frame assembly 11 so as to reduce the overall height of the implement when moving the implement from one area to another.

Due to the stresses which are imparted to the implement during use, and especially when the implement is in a cantilevered position during the operation of the compaction ram, it is envisioned that the implement will normally be manufactured using steel tubing and beams. However, under some circumstances, it may be possible to use some aluminum alloy components in the implement in order to reduce the overall weight thereof thereby facilitating the mounting and dismounting of the implement relative to a supporting vehicle.

In use of the compaction implement of the present invention, the invention is first mounted to a conventional tractor or other vehicle having hydraulic control systems for use with equipment normally associated with such vehicles. The frame assembly may be readily secured to the equipment support beam of the tractor by a plurality of mounting pins or bolts which extend through openings in the mounting frame assembly and in the support beam. Once the frame assembly has been mounted to the vehicle, the hydraulic lines 32-33, 56-57 and 81-82 are connected in a conventional manner to the hydraulic controls of the tractor. Thereafter, the equipment may be transported to a site where compaction of material is to take place.

In preparation for compacting material into a container or trailer such as shown in FIGS. 1 and 2, the carriage support frame 24 is initially raised to a horizontal position by activation of the hydraulic cylinders 29 causing the frame to pivot about the upper ends of the vertical supports 12 of the mounting frame assembly. Thereafter, the tractor is driven into perpendicular relationship with respect to the side of the trailer or container which is to be compacted until the bumper elements 22 engage the side of the vehicle or come in proximate relationship thereto. Thereafter, the compaction ram assembly may be operated by controls carried on the tractor which are connected through the hydraulic lines to the hydraulic cylinder 74. As the hydraulic piston is actuated, the compaction plate will be urged downwardly into the material which has been previously loaded into the trailer compacting it a distance of up to 4 to 5 five with such distance being selectively adjusted by altering the stroke of the piston rod. As the compaction plate is raised and lowered, the carriage 36 is continuously shifted between the side walls of the container or trailer. As previously discussed, the movement of the carriage is automatically limited so that the compaction plate will not interfere with or contact the side walls of the trailer or container. In conventional operations, the vehicle width may be considered to be normally approximately 8 feet, and therefore, the maximum limit of travel of the carriage is predetermined to be limited to 7 feet generally centered between the side walls of the vehicle when in the position shown in FIG. 2.

Utilizing the compaction implement of the present invention, it is possible to increase the load capacity of the transport vehicle by as much as 25-30% or more thereby increasing the economical transportation of such goods or products as cotton or other fibrous material from the field to a processing point such as a gin mill.

I claim:

1. A compaction implement for use with conventional farm type vehicles including tractors comprising a compaction ram assembly, a mounting frame assembly for selectively securing said compaction ram assembly to the vehicle, said mounting frame assembly having first means for engaging the vehicle and vertical support means extending upwardly therefrom, carriage support frame means pivotally mounted to said vertical support means of said mounting frame means, a carriage means movably supported on said carriage support frame means, carriage drive means mounted to said carriage support frame means for adjusting said carriage means along the length of said carriage support frame means, means for mounting said compaction ram assembly to said carriage means, said compaction ram assembly having an extendable rod means and a compaction plate means mounted to said rod means for vertical movement with respect to said carriage means.

2. The compaction implement of claim 1 in which said carriage support frame means includes a pair of side rails which extend generally parallel with one another, said carriage means including a pair of dollies movable along said side rails of said carriage support frame, said dollies including roller means for engaging said side rails and guide flange means extending downwardly with respect to said side rails of said carriage support frame so as to insure the alignment of said roller means of said carriage with said side rails.

3. The compaction implement of claim 2 in which said compaction ram assembly includes a pair of guide elements secured to said compaction plate means and extending outwardly generally perpendicular with respect thereto, said carriage means including first and second frame means having roller bearings therein, said roller bearings of said first guide frame means being aligned with said roller bearings of said second guide frame means and said guide elements of said compaction ram assembly being slidably extendable through said aligned roller bearings of said first and second frame means.

4. The compaction implement of claim 2 including opposing stop means carried by said carriage support frame means, said carriage means being movable between said stop means and being engagable therewith so as to limit the movement of said carriage means with respect to said side rails.

5. A compaction implement for use with conventional farm type vehicles including tractors having hydraulic implement controls comprising a compaction ram assembly, a mounting frame assembly for selectively securing said compaction ram assembly to the vehicle, said mounting frame assembly having first means for securing said mounting frame to the vehicle and vertical support means extending upwardly therefrom, carriage support frame means pivotally mounted to said vertical support means of said mounting frame means, said carriage support means including a pair of spaced side rails having outer end portions cantilevered outwardly of said mounting frame means and remote from the vehicle and inner end portions spaced inwardly of the pivotal mounting between said mounting frame assembly and said carriage support frame means and toward the vehicle, adjustment means connected to said inner end of said side rails for pivotally adjusting said carriage support frame means relative to said mounting frame assembly, a carriage means movably supported on said carriage support frame means, said carriage including roller means for engaging said carriage support frame means, carriage drive means mounted to said carriage support frame means for moving said carriage means along the length of said carriage support frame means, means for mounting said compaction ram assembly to said carriage means, said compaction ram assembly including first hydraulic cylinder means mounted to said carriage means, said first hydraulic cylinder having a cylinder rod and a compaction plate means mounted to said cylinder rod for vertical movement therewith, and means for connecting said first hydraulic cylinder to the hydraulic implement controls of the vehicle.

6. The compaction implement of claim 5 in which said carriage means includes a pair of dollies movable along said side rails of said carriage support frame, said dollies including guide flange means extending downwardly with respect to said roller means and said side rails of said carriage support frame so as to insure the alignment of said roller means of said carriage with said side rails.

7. The compaction implement of claim 6 in which said compaction ram assembly includes a pair of guide elements secured to said compaction plate and extending outwardly generally perpendicular with respect thereto, said carriage means including first and second frame means having roller bearings therein, said roller bearings of said first guide frame means being aligned with said roller bearings of said second guide frame means and said guide elements of said compaction ram assembly being slidably extendable through said aligned roller bearings of said first and second frame means.

8. The compaction implement of claim 7 in which said carriage means includes a central mounting bracket, pin means for connecting said first hydraulic cylinder means to said mounting bracket, each of said guide means being extendable through said roller bearing means so as to be displaceable therefrom so as to permit said compaction plate to be removably mounted from said carriage means.

9. The compaction implement of claim 8 in which said carriage drive means includes a pair of elongated control line means secured at opposite ends of each of said dollies of said carriage means, pairs of spaced sprocket means mounted adjacent said inner and outer end portions of said side rails of said carriage support frame means, said elongated control line extending over said sprocket means, and motor means drivingly connected to at least one of said sprocket means for moving said elongated control lines.

10. The compaction implement of claim 9 including opposing first and second stop means carried by said carriage support frame means, said first stop means being mounted adjacent said outer end portions of said side rails and said second stop means being mounted adjacent the pivotal mounting between said carriage support frame means and said mounting frame assembly, said first and second stop means being engagable with said carriage means to limit the movement of said carriage means.

11. The compaction implement of claim 10 in which said adjustment means includes at least one second hydraulic cylinder means connected to said vertical support means of said mounting frame assembly, said second hydraulic cylinder means having a piston rod extending outwardly therefrom, means for connecting said piston rod to said inner end portion of said carriage support frame means and hydraulic line means connecting said second hydraulic cylinder means to the hydraulic implement controls of the vehicle.

12. The compaction implement of claim 11 in which said motor drive means to said carriage drive means includes a reversible hydraulic motor and hydraulic lines connecting said reversible hydraulic motor to the implement controls of the vehicle.

13. A compaction implement for use with conventional farm type vehicles including tractors having hydraulic implement controls comprising a compaction ram assembly, a mounting frame assembly for selectively securing said compaction ram assembly to the vehicle, said mounting frame assembly having first means for securing said mounting frame assembly to the vehicle and vertical support means extending upwardly therefrom, carriage support frame means pivotally mounted to said vertical support means of said mounting frame assembly, said carriage support frame means having an outer end portion cantilevered outwardly from the vehicle and inner end portions disposed on the opposite side of the pivotal mounting with said mounting frame assembly, a carriage means movably supported on said carriage support frame means, said carriage support frame means including a pair of side rails which extend generally parallel with one another, said carriage means including a pair of dollies movable along said side rails of said carriage support frame, said dollies including roller means, carriage drive means mounted to said carriage support frame means for adjusting said carriage means along the length of said carriage support frame means, guide means carried by said carriage means, said compaction ram assembly being disposed through said guide means being carried by said carriage means, said compaction ram assembly having a first hydraulic cylinder mounted to said carriage means and a compaction plate means mounted to said first hydraulic cylinder means for vertical movement relative to said carriage means.

14. The compaction implement of claim 13 including second hydraulic cylinder means connected to said vertical supports of said first frame means, said second hydraulic cylinder means having a piston rod extending outwardly therefrom and means for connecting said piston rod to the inner end portions of said carriage support frame means.

15. The compaction implement of claim 14 in which said carriage drive means includes a reversible hydraulic motor carried by said carriage support frame means, means for connecting said hydraulic motor to opposite sides of said carriage means whereby said carriage means may be selectively moved in opposite directions by said hydraulic motor.

16. The compaction implement of claim 15 including opposing stop means carried by said carriage support frame means, said stop means being engagable with said carriage means to limit the movement of said carriage means between and inwardly of said outer end portion of said carriage support frame means and the point of pivoted contact between said carriage support frame means and said mounting frame assembly.

17. The compaction implement of claim 16 in which said compaction ram assembly includes a pair of guide elements secured to said compaction plate and extending outwardly generally perpendicular with respect thereto, said carriage means including first and second frame means having roller bearings therein, said roller bearings of said first guide frame means being aligned with said roller bearings of said second guide frame means and said guide elements of said compaction ram assembly being guidingly extendable through said aligned roller bearings of said first and second frame means.

18. The compaction implement of claim 17 in which said means for connecting said hydraulic motor to opposite sides of said carriage means including a pair of sprocket means secured adjacent each of said inner and outer end portions of said carriage support frame means, chain means carried by said sprocket means and secured on opposite ends of said dollies, and means for drivingly connecting said hydraulic motor to said sprocket means.

* * * * *